Patented Dec. 20, 1938

2,140,782

UNITED STATES PATENT OFFICE 2,140,782

ALKYLATION OF PHENOLS

James B. Arnold and Ralph P. Perkins, Midland, Mich., assignors to The Dow Chemical Company, Midland, Mich., a corporation of Michigan No Drawing. Application May 25, 1937,
Serial No. 144,666

15 Claims. (Cl. 260—624)

The present invention concerns an improved method of alkylating phenols with alcohols containing less than six carbon atoms per molecule. It refers more particularly to a new method of making tertiary butyl phenols.

The alkylation of a phenol with an alcohol in the presence of a catalyst is well known and is generally considered to take place stepwise as represented by the equations:

Alcohol→olefin+water
Olefin+phenol→alkylphenol

An elevated temperature is usually required to decompose the alcohol into an olefin and water, and in the case of alcohols containing less than six carbon atoms per molecule such temperature is above the normal boiling point of both the alcohol and its corresponding olefin. Accordingly, in reacting a phenol with an alcohol containing less than six carbon atoms per molecule, it has heretofore been customary to conduct the reaction in a closed container under relatively high pressure in order to avoid the loss of alcohol or olefin. In such method the water formed by the reaction is retained in the mixture and tends to retard further reaction and to prevent the same from running to completion. In addition, such process is hazardous, since it involves heating under high pressure materials that are toxic and inflammable.

The reaction of a phenol and an alcohol has also been carried out at lower temperatures and pressures using a large proportion of a dehydrating and condensing agent, such as aluminum chloride or sulfuric acid. The yields reported for this latter procedure are low, rarely exceeding 50–60 per cent of the theoretical, (see Huston and Hsieh, J. Am. Chem. Soc. 58, 439 (1936)) and the catalyst cannot be re-employed in subsequent reactions without expensive treatment.

We have now discovered that the alkylation of a phenol with an alcohol containing less than six carbon atoms per molecule may be carried out at approximately atmospheric pressure simply by maintaining the phenol together with a small proportion of a stable dehydration and condensation catalyst at an elevated temperature and adding the alcohol slowly and with vigorous agitation, preferably at a point beneath the surface of the mixture. By operating in this manner the alcohol is dehydrated, the olefin so produced reacts with the phenol before any substantial amount of alcohol or olefin can volatilize from the reaction mixture, and the water distills off as rapidly as it is formed. Furthermore, the use of high pressures or the employment of a large proportion of catalyst is avoided, and an alkyl phenol may be prepared in higher yield than is possible by the previously known methods of carrying out the reactions hereinbefore described.

The invention, then, consists of the method of alkylating phenols with alcohols containing less than six carbon atoms per molecule hereinafter fully described and particularly pointed out in the claims.

The alcohols which may be employed in accordance with the invention comprise secondary and tertiary monohydric aliphatic alcohols containing less than six carbon atoms per molecule, e. g. isopropanol, secondary butanol, tertiary butanol, tertiary amyl alcohol, etc. Primary alcohols have been found practically inoperative in the present process.

The phenolic reactant may be a monohydric or polyhydric phenol which may contain nuclear substituents such as alkyl groups or halogen, etc., provided one or more positions in the nucleus is open for the introduction of an alkyl group by the reaction. Among the various phenolic compounds which may be used are: phenol, ortho-chlorphenol, cresols, chlorocresols, naphthols, phenylphenols, resorcinol, guaiacol, etc. In general, any phenol which can be alkylated to form a corresponding alkyl phenol by reaction with an olefin may be employed in the present process.

A stable catalyst of the dehydration and condensation type is used, since the function of the catalyst is to promote dehydration of the alcohol and chemical condensation of the resultant olefin with the phenol. By a "stable" catalyst is meant one which is not destroyed by the water formed in the reaction, i. e. if the catalyst is a substance which forms a hydrate, it should be capable of being regenerated from such hydrate by heating the latter. Acid-activated bleaching earths, e. g. "Retrol" or "Tonsil", are particularly suitable as catalysts in the process, but various other substances such as sulfuric acid, ferric chloride, zinc chloride, sulfonic acids, etc., may be employed.

In carrying out the alkylation, the phenol and a small proportion of catalyst are heated to the desired reaction temperature. The alcohol is then added slowly with stirring, usually during a period of one to eight hours or more, preferably beneath the surface of the mixture and in the zone of most powerful agitation. Water distills from the mixture as fast as it is formed, so that the reaction proceeds under substantially anhydrous conditions. Although the reactants and catalyst may be employed in widely varying proportions, we prefer to mix the phenol and a small proportion, i. e. from 0.2 to 10.0 and preferably from 0.5 to 3.0 per cent of its weight, of catalyst and slowly add 0.3 to 1 molecular equivalent of the alcohol.

The temperature to which the mixture must be heated in order to dehydrate the alcohol varies somewhat depending upon the particular alcohol and catalyst employed. The dehydration usually occurs smoothly at temperatures between 80° and 200° C., particularly between 130° and 180° C. In practice the mixture is usually heated at approximately atmospheric pressure to a temperature of about 135°–180° C., so that the water formed by the reaction distills readily from the reaction mixture. If it is desired to conduct the alkylation at a temperature below 135°–150° C., it may be carried out at reduced pressure in order to remove the water, or in the presence of an inert water-immiscible solvent, e. g. benzene, which is capable of forming a low-boiling mixture with the water.

Operation in the manner just described is continued until all of the alcohol has been added and distillation of water ceases. The mixture may then be cooled at once but is preferably heated to a temperature of at least 170° C. for 0.5 hour or more to insure complete reaction. After such heating the mixture is cooled, the catalyst removed therefrom by usual procedure, e. g. filtration, or washing with water or a mineral acid solution, etc., and the alkyl phenol product is separated by distillation or otherwise. When an acid-activated bleaching earth is used as catalyst it may be recovered by filtration and re-employed in subsequent reactions.

When tertiary butanol is reacted with a phenol, despite the elevated reaction temperature practically no alcohol or olefin volatilizes from the reaction mixture. With other alcohols, however, a small proportion of the olefin may vaporize along with the water formed. When reacting such other alcohols it is therefore preferable to condense and remove the water as usual and return the olefin to the reaction. Alternatively the alkylation may be conducted in a closed system at moderate pressure, i. e. 1–4 atmospheres, condensing the vaporized water and returning the olefin to the mixture. In certain alkylations at atmospheric pressure a small proportion of the phenol may steam-distill along with the water formed. Such phenol may be separated and returned to the reaction.

When the alkylation of a phenol with an alcohol is conducted in accordance with the invention the reaction product is largely the para-alkyl phenol, provided the para position of the reactant phenol is open for substitution. Isomeric alkyl phenols are also sometimes obtained in relatively small yield. We have found that higher alkylation temperatures, e. g. temperatures above 150° C., favor the formation of the para-alkyl phenol at the expense of the other isomers. We have also found that when such other isomeric alkyl phenols from the reaction of a phenol with an alcohol are initially added to a reaction mixture, the formation of these isomeric alkyl phenols during reaction is greatly repressed. Accordingly, by alkylating a phenol with an alcohol at a temperature above 150° C. and adding to the reaction mixture the undesired isomeric alkyl phenol fractions from a previous alkylation, the para-alkyl phenol may be obtained as substantially the only product.

The following examples illustrate several ways in which the principle of the invention has been employed, but are not to be construed as limiting its scope:

*Example 1*

A mixture of 846 grams (9 mols) of phenol and 25.4 grams of "Retrol" (an acid-activated bleaching earth) was heated to about 150° C. at atmospheric pressure. While maintaining the mixture at such temperature and stirring vigorously, 458 grams (6 mols) of tertiary butanol (97 per cent pure) was run in at a point directly below the stirrer over a 2.0 hour period, during which time water distilled slowly from the reaction mixture. When addition of the alcohol was complete, the reaction mixture was heated at 170° C. for 1.0 hour. During the entire reaction, 137 grams of water and 16.0 grams of phenol distilled from the reaction mixture. This mixture was then cooled to 100° C., filtered, and fractionally distilled whereby 4.0 grams of water, 335.0 grams of phenol, 43.6 grams of ortho-tertiary butyl phenol, 700.2 grams of para-tertiary butyl phenol, and 42.4 grams of di-tertiary butyl phenol were separated. The yield of para-tertiary butyl phenol based on the phenol consumed was 85.1 per cent.

*Example 2*

A mixture of 282 grams (3 mols) of phenol and 2.8 grams of concentrated sulfuric acid was heated to a temperature of about 150° C. and was reacted with 153 grams (2 mols) of tertiary butanol according to the procedure of Example 1. The yield of tertiary butyl phenol was 80.9 per cent of the theoretical.

*Example 3*

A mixture of 376 grams (4 mols) of phenol and 11.3 grams of "Retrol" was heated to a temperature of about 170° C. and was reacted with 111 grams (1.5 mols) of secondary butanol according to the procedure of Example 1. The yield of para-secondary butyl phenol was 46.1 per cent of the theoretical.

*Example 4*

A mixture of 282 grams of phenol and 8.5 grams of "Tonsil" (an acid-activated bleaching earth) was heated to 170° C. and reacted with 176 grams (2 mols) of tertiary amyl alcohol according to the procedure of Example 1. The yield of tertiary amyl phenol was 58.4 per cent of theoretical.

*Example 5*

A mixture of 324 grams (3 mols) of ortho-cresol and 9.7 grams of "Retrol" was heated to 150° C. and reacted with 148 grams (2 mols) of tertiary butanol according to the procedure of Example 1. The yield of para-tertiary-butyl ortho-cresol was 76.4 per cent of theoretical.

*Example 6*

A mixture of 385.5 grams (3 mols) of ortho-chlorphenol and 11.6 grams of "Tonsil" was heated to 150° C. and reacted with 148 grams (2 mols) of tertiary butanol according to the procedure of Example 1. The yield of para-tertiary-butyl ortho-chlor-cresol was 44.6 per cent of theoretical.

Other modes of applying the principle of our invention may be employed instead of the ones explained, change being made as regards the method herein disclosed, provided the step or steps stated by any of the following claims or the equivalent of such stated step or steps be employed.

We therefore particularly point out and distinctly claim as our invention:—

1. The method of alkylating a phenol which comprises reacting the latter at a pressure not exceeding four atmospheres with an alcohol selected from the group consisting of secondary and tertiary monohydric aliphatic alcohols containing less than six carbon atoms per molecule, in the presence of a small proportion of a stable dehydration and condensation catalyst, while agitating the mixture and vaporizing water therefrom.

2. In a method of making an alkyl phenol by reacting a phenol with an alcohol selected from the group consisting of secondary and tertiary monohydric aliphatic alcohols containing less than six carbon atoms per molecule, the steps of introducing such alcohol gradually into a mixture comprising the phenol and a small proportion of a stable dehydration and condensation catalyst, while stirring and heating the mixture at approximately atmospheric pressure to vaporize water therefrom.

3. The method of alkylating a phenol which comprises reacting the latter with an alcohol selected from the group consisting of secondary and tertiary monohydric aliphatic alcohols containing less than six carbon atoms per molecule at approximately atmospheric pressure and at a temperature of at least 80° C. in the presence of a small proportion of stable dehydrating and condensing catalyst, while agitating the mixture and vaporizing water therefrom.

4. In a method of making an alkyl phenol by reacting a phenol with an alcohol selected from the group consisting of secondary and tertiary monohydric aliphatic alcohols containing less than six carbon atoms per molecule, the steps of introducing such alcohol gradually into a mixture comprising the phenol and a small proportion of a stable dehydration and condensation catalyst at a point beneath the surface of such mixture, while stirring and heating the latter at a temperature of at least 135° C. and at approximately atmospheric pressure to distill water therefrom.

5. In a method of making an alkyl phenol by reacting a phenol with an alcohol selected from the group consisting of secondary and tertiary monohydric aliphatic alcohols containing less than six carbon atoms per molecule, the step of introducing such alcohol gradually into a mixture comprising the phenol and a small proportion of a stable dehydration and condensation catalyst at a point beneath the surface of such mixture, while stirring and heating the latter at a temperature of at least 135° C. and at approximately atmospheric pressure, distilling water from the mixture as it is formed until such distillation substantially ceases, and thereafter heating the mixture to a temperature of at least 170° C. until reaction is complete.

6. The method of alkylating a phenol which comprises reacting the latter at approximately atmospheric pressure with an alcohol selected from the group consisting of secondary and tertiary monohydric aliphatic alcohols containing less than six carbon atoms per molecule, in the presence of a small proportion of an acid-activated bleaching earth, while agitating the mixture and vaporizing water therefrom.

7. The method of alkylating a phenol which comprises reacting the latter at approximately atmospheric pressure with an alcohol selected from the group consisting of secondary and tertiary monohydric aliphatic alcohols containing less than six carbon atoms per molecule, in the presence of a small proportion of sulfuric acid, while agitating the mixture and vaporizing water therefrom.

8. In a method of making a para-alkyl substituted phenol by reacting a phenol with an alcohol selected from the group consisting of secondary and tertiary monohydric aliphatic alcohols containing less than six carbon atoms per molecule at approximately atmospheric pressure and in the presence of a small proportion of a stable dehydrating and condensing catalyst, wherein other alkyl-substituted phenols tend to form along with the desired para-alkyl substituted phenol, the step which consists in adding such other alkyl-substituted phenols to the reaction mixture.

9. The method of making para-tertiary butyl phenol which comprises reacting phenol at approximately atmospheric pressure with tertiary butanol in the presence of a small proportion of a stable dehydrating and condensing catalyst, while agitating the mixture and vaporizing water therefrom.

10. In a method of making para-tertiary butyl phenol by reacting phenol with tertiary butanol, the steps of introducing tertiary butanol into a mixture comprising phenol and a small proportion of a stable dehydration and condensation catalyst gradually at a point beneath the surface of such mixture while stirring and heating the latter at a temperature of at least 135° C., and at approximately atmospheric pressure to vaporize water therefrom.

11. The method of making para-tertiary butyl phenol which comprises reacting phenol at approximately atmospheric pressure with tertiary butanol in the presence of a small proportion of an acid-activated bleaching earth, while agitating the mixture and vaporizing water therefrom.

12. The method of making para-tertiary butyl phenol which comprises reacting phenol at approximately atmospheric pressure with tertiary butanol in the presence of a small proportion of sulfuric acid, while agitating the mixture and vaporizing water therefrom.

13. In a method of making para-tertiary butyl phenol by reacting phenol with tertiary-butanol at approximately atmospheric pressure and in the presence of a small proportion of a stable dehydrating and condensing catalyst, wherein other tertiary butyl phenols tend to form along with the desired para-tertiary butyl phenol, the step which consists in adding such other tertiary butyl phenols to the reaction mixture.

14. In a method of making an alkyl phenol by reacting a phenol with an alcohol selected from the group consisting of secondary and tertiary monohydric aliphatic alcohols containing less than six carbon atoms per molecule, the steps of introducing such alcohol gradually into a mixture comprising the phenol and a small proportion of an acid-activated bleaching earth while stirring and heating the mixture at approximately atmospheric pressure to vaporize water therefrom.

15. In a method of making para-tertiary butyl phenol by reacting phenol with tertiary butanol, the steps of introducing tertiary butanol gradually into a mixture comprising phenol and a small proportion of a stable dehydration and condensation catalyst while stirring and heating the mixture at a temperature of at least 80° C. and at approximately atmospheric pressure to vaporize water therefrom.

JAMES B. ARNOLD.
RALPH P. PERKINS.